(No Model.)
J. S. SANGER & H. A. KINGSLAND.
PNEUMATIC TIRE AND WHEEL RIM.
No. 548,820.  Patented Oct. 29, 1895.
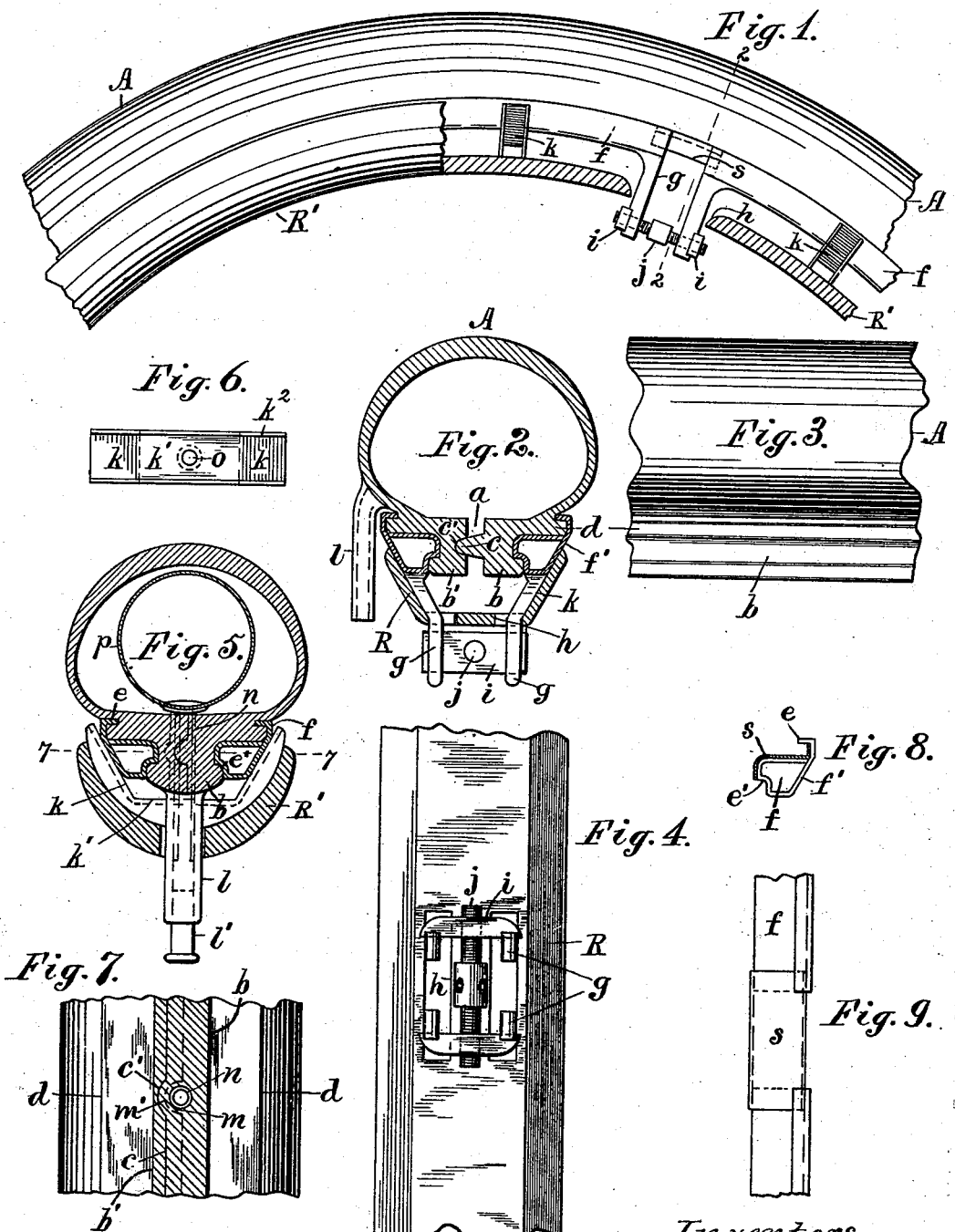
Attest:
L. Lee.
Edw. F. Kinsey
Inventors.
Hugh A. Kingsland,
John S. Sanger,
per Thomas S. Crane, Atty.

UNITED STATES PATENT OFFICE.

JOHN S. SANGER, OF ORANGE, AND HUGH A. KINGSLAND, OF BELLEVILLE, NEW JERSEY.

PNEUMATIC TIRE AND WHEEL-RIM.

SPECIFICATION forming part of Letters Patent No. 548,820, dated October 29, 1895.

Application filed February 4, 1895. Serial No. 537,169. (No model.)

*To all whom it may concern:*

Be it known that we, JOHN S. SANGER, of Orange, and HUGH A. KINGSLAND, of Belleville, Essex county, New Jersey, citizens of the United States, have invented certain new and useful Improvements in Pneumatic Tires and Wheel-Rims, fully described and represented in the following specification and the accompanying drawings, forming a part of the same.

This invention consists in an improved means of forming a separable longitudinal air-tight joint in a pneumatic tire; and the invention consists in the combination, with a wheel-rim, of an air-sac or tire having a longitudinal opening upon its inner side, with separable edges adapted to form an air-tight joint, and means upon the wheel-rim outside of the sac or tire for pressing such edges into air-tight contact with one another.

The invention also includes a wheel-rim having sloping guides upon its inner sides and a pneumatic tire having a longitudinal opening with separable edges adapted to form an air-tight joint, clamps embracing such edges and fitted to such inclined guides, and means for drawing the clamps inward upon the inclined guides to crowd the edges of the joint together.

The invention will be understood by reference to the annexed drawings, in which—

Figure 1 is a side elevation of part of a tire and wooden wheel-rim with the rim partly broken away to the center line at the clamp. Fig. 2 is a section of the same construction on line 2 2 in Fig. 1 with the joint of the tire unclamped, as in Fig. 1. Fig. 3 is a side elevation of a portion of the tire. Fig. 4 shows the under side of the metal wheel-rim, with the means for tightening the clamps. Fig. 5 is a cross-section of such rim with the tire unclamped. Fig. 6 shows the under side of one of the clamp-guides for wooden rim. Fig. 7 is a section of the tire on line 7 7 in Fig. 5. Fig. 8 is an end view of one of the clamp-rings with the splice-piece, and Fig. 9 is a plan view of the same.

The longitudinal joint of the tire A is designated by the letter *a* in Fig. 2, at each side of which the base or edges of the tire are thickened to form projecting ribs $b\,b'$, formed, respectively, with tongue $c$ and groove $c'$. The outer sides of the ribs are provided with ridges $d$ to engage annular hooks $e$ and $e'$, which are formed upon annular clamp-rings F, divided each at one side to form an opening, by which the ends of the ring may be drawn toward one another to contract its diameter. Such ends are shown with ears $g$ projected outward through a slot $h$ in the wheel-rim and connected by means of nuts $i$, to which are fitted a right and left screw $j$. The nuts are fitted to notches in the outer ends of the ears $g$ to permit their approximation when forced together. The clamp-rings are formed upon the outer side with bevel $f'$, and the inner sides of the wheel-rim are sloped inwardly to form inclined guides $k$.

The wheel-rim, when formed of metal, as indicated at R in Fig. 2, may have the sides inclined to form such guides; but where the rim is made of wood R', as shown in Fig. 5, the guides may be inserted at intervals therein, as shown in Fig. 1. The opposite guides $k$ are shown formed in one piece with an intermediate tie $k'$, having ribs $k^2$, (shown in Figs. 1 and 6,) which would be shaped to fit the interior of the wooden rim. Such loose guides may be secured by a screw inserted through a hole $o$ shown in the tie $k'$ in Fig. 6.

When the ends of the ring are drawn together and the diameter contracted, the pressure of the bevels $f'$ against the inclined guides $k$ forces the two clamp-rings together, and thus presses the ribs $b\,b'$ forcibly toward one another. Such movement of the ribs presses the tongue $c$ into the groove $c'$, as shown in Fig. 2. Either the tongue or groove, or both, may be made of yielding material, and such compression makes a continuous air-tight joint upon the inner side of the tire and forms a closed sac, which may be inflated and used for a single-tube tire, if desired.

Where the ribs $b\,b'$ are made of soft rubber, the compression brings their adjacent surfaces into close contact and also presses the rubber upward and downward, as represented in Fig. 2, the elasticity of the material under such compression producing a very tight joint.

Where the tire is used as a pneumatic sac, the air-tube $l$ for inflating the same may be formed at one side, as shown in Fig. 2. Such air-tube $l$ may also be formed on the line of the joint, as indicated in Figs. 5 and 7, where an inner sac $p$ is shown attached to the inner end of an air-tube $n$, passed through the integral lug $m$, continuous with the tube $l$ upon the edge of one rib $b$. A corresponding recess $m'$ is formed in the opposite edge of the rib $b'$. The tongue and groove are preferably extended around such lug and recess, as indicated by the line $c'$ in Fig. 7, and the metal tube $n$ is inserted through the lug to prevent the collapsing of the air-passage by the pressure which forms the joint. The tube $l$ would be formed with any suitable air-valve, as indicated at $l'$ in Fig. 5.

The device is operated as follows: The clamp-screw $j$ is turned to relax the annular clamps as much as possible, and the ribs $b$ and $b'$ are crowded one after the other into the required position between the same, with the tongue $c$ in the groove $c'$. The clamp-screw is then turned to contract the clamps, which, by diminishing their diameter, draws them inward between the inclined guides upon the rim and presses the ribs at the base of the tire into air-tight contact with one another, as shown in Fig. 2. The tire may then be inflated if it is constructed for use as a single-tube tire; but if intended for use as a double-tube tire the sac $p$ within the same, which is shown in Fig. 5, would be inflated, and the complete tire would then be ready for use.

Each of the annular rings $f$ is shown made of sheet metal bent into a transverse section adapted to form the hooks $e$ and $e'$ and sloping sides $f'$, which extend continuously around the circle except at the opening, where the lugs $g$ are attached. At this point a splice-piece $s$ is extended across the opening and attached to the ring at one side of the same. The splice-piece bears upon the outer side of the rib $b$ or $b'$, and thus conveys the pressure to the ribs across the opening of the clamp-ring. The clamp-rings may be made of any suitable material and construction to embrace the outer sides of the ribs and to force their separable edges together to form the joint, and other means besides the screw $j$ may be used to contract the opening of the clamp-rings.

If hooks similar to $e$ or $e'$ be formed upon one side of the wheel-rim in the innermost position of the clamp, (shown in Fig. 1,) it is obvious that one of the ribs or separable edges of the tire could be engaged by such hooks and the opposite side forced against the same by a single moving clamp-ring.

From the above description it will be seen that the construction is adapted especially to dispense with the inner sac in the formation of a pneumatic tire, and thus avoid the complication involved in the use of a double-tube tire by furnishing an effective means of pressing the yielding edges of a longitudinal joint together upon the single-tube tire, and thus forming an air-tight joint upon the same which is equally adapted to be opened at pleasure for repairing the tire upon the inner side.

Where the double-tube tire is preferred, the construction shown in Fig. 5 may be used, in which case the construction of the clamps and wheel-rim furnishes a very strong and durable means of holding the exterior tire to the rim of the wheel.

We are aware that numerous tire-coverings have been devised to protect an internal air-sac or tire, such covering being provided with a longitudinal opening and the wheel-rim being provided with clamps to press the edges of the tire firmly against the wheel-rim. In such constructions there is no necessity to form an air-tight joint between the separable edges of the tire, and no means is therefore used to press such edges into air-tight contact with one another. Our invention is distinguished from such constructions by the use of a pneumatic tire with a longitudinal opening having edges adapted to form an air-tight joint and the provision of means upon the wheel-rim outside of the tire for pressing such edges into air-tight contact, and thus forming a pneumatic sac which may be expanded by the direct introduction of air without the use of an internal sac.

Having thus set forth the nature of the invention, what we claim herein is—

1. The combination, with a wheel rim having oppositely inclined sloping guides upon its inner sides, of a pneumatic tire having a longitudinal opening with separable edges adapted to form an air tight joint, clamps embracing such edges and fitted to such inclined guides, and means for drawing the clamps inward upon the inclined guides to crowd the edges of the joint together to form an air tight sac, as herein set forth.

2. The combination, with a wheel rim having sloping guides upon its inner sides, of a pneumatic tire having a longitudinal joint with separable edges, and a clamp formed of one or more annular beveled rings with openings at one side, the clamp being fitted to such inclined guides, and means for contracting the annular clamp, as and for the purpose set forth.

3. The combination, with the wooden wheel rim R′, of the inclined metallic guides $k$ fitted transversely to the interior of the wooden rim at intervals, the beveled clamp rings fitted to such guides, with an opening upon one side of each clamp ring, the said rings being provided with means to grasp the opposite sides of the tire, and with means for drawing the clamps inward upon the inclined guides, to crowd the edges of the joint together to form an air tight sac, substantially as herein set forth.

4. As a new article of manufacture, the pneumatic tire herein shown and described, having upon its inner side the longitudinal joint with tongue and grooved edges, the integral lug $m$ formed upon one of the said edges, with the valve tube $l$ inserted through such lug, and the recess $m'$ formed upon the other one of the said edges, to receive the said lug, as and for the purpose set forth.

In testimony whereof we have hereunto set our hands in the presence of two subscribing witnesses.

JOHN S. SANGER.
HUGH A. KINGSLAND.

Witnesses:
JOSEPHINE SANGER,
THOS. S. CRANE.